United States Patent [19]
Hoyt et al.

[11] Patent Number: 5,800,034
[45] Date of Patent: Sep. 1, 1998

[54] TOY FILM VIEWER AND METHOD OF MAKING SAME

[75] Inventors: David Hoyt; Gary T. Aldcroft, both of Gardena, Calif.

[73] Assignee: Principle Plastics, Gardena, Calif.

[21] Appl. No.: 876,184

[22] Filed: Jun. 13, 1997

[51] Int. Cl.[6] .................................................. G03B 21/14
[52] U.S. Cl. ........................... 353/109; 353/DIG. 2; 40/364
[58] Field of Search ....................... 353/43, 88, 103, 353/109, DIG. 2; 40/362, 363, 364, 366, 361; 352/129, 159

[56] References Cited

U.S. PATENT DOCUMENTS

| | | | |
|---|---|---|---|
| 1,957,378 | 5/1934 | Zimmerman | 40/366 |
| 3,756,706 | 9/1973 | Klynn | 352/129 |
| 4,591,238 | 5/1986 | Kitaoka et al. | 353/43 |

*Primary Examiner*—William Dowling
*Attorney, Agent, or Firm*—James E. Brunton

[57] ABSTRACT

A manually operated toy film viewer of simple design for viewing an 8 millimeter film loop contained within the housing of the viewer. In operating the toy film viewer, the loop of 8 millimeter film is controllably moved past a viewing aperture by a manual crank handle which is rotatably connected to one side of the hollow housing. The apparatus includes a feed sprocket, a spring biased shutter, a simple optical lens and a translucent screen disposed within a small window which is located opposite the viewing aperture and in close proximity with the film loop. Both the drive sprocket and the shutter of the film viewer are operated by the hand crank which car be easily manipulated by the child to controllably advance the film past the viewing aperture.

20 Claims, 8 Drawing Sheets

TOY FILM VIEWER AND METHOD OF MAKING SAME

BACKGROUND OF THE INVENTION

1. Field of the Invention

The present invention relates generally to mechanical toys. More particularly, the invention concerns a manually operated, toy film viewer of simple design for viewing an 8 millimeter film loop contained within the housing of the viewer.

2. Discussion of the Prior Art

Various types of film viewers have been suggested in the past for viewing 8 and 16 millimeter film. The most common type of apparatus for viewing movie film is the traditional movie projector. In the typical prior art movie projector, the rays from a source of light pass through the film image and are projected by a lens onto a screen. In operating the projector, each image on the film is projected onto the screen for a short time and the film then moves on so as to bring the next image into position for projection. The feeding mechanism of the projector which moves the film along can take several forms, but typically comprises a pivoting claw, the points of which engage the perforations of the film and, with each movement, pull it down a distance corresponding to one image. During the time when the image is being projected, the film is stationary and the head of the feeding claw returns to its initial position. Prior art movie projectors, which are typically driven by electric motors, are of a relatively complex design and include a fan or blower for cooling the lamp and the film guide and advancement mechanisms.

Other professional and semi-professional types of film viewers have been developed in the past for use in connection with editing and splicing of film. These devices range in sophistication from relatively simple mechanically operated devices wherein the filmstrip is moved manually past the viewing aperture, to very complicated devices wherein the film is advanced, viewed, cut and spliced by sophisticated electro-mechanical mechanisms.

The thrust of the present invention is to provide a compact, very simple, manually operated film viewer having as its main purpose the entertainment of small children. Accordingly, the toy film viewer of the present invention must, of necessity, be sturdy and easy for the child to use, but at the same time must be of a simple, straight-forward design which is easy to manufacture at relatively low cost.

In the simplest form of the apparatus of the present invention, the viewer comprises a hollow housing within which a loop of 8 millimeter film is controllably moved past a viewing aperture by a manually operated crank handle which is rotatably connected to one side of the hollow housing. The apparatus further includes a feed sprocket, a spring biased shutter, a simple optical lens and a translucent screen disposed within a small window which is located opposite the viewing aperture and in close proximity with the film loop. Both the drive sprocket and shutter of the apparatus are operated by the hand crank, which can be easily operated by the child to controllably advance the film past the viewing aperture.

Another important aspect of the present invention is the method for producing the 8 millimeter film strips used in the film viewer. As will be better understood from the discussion which follows, in the preferred form of the invention, the film strip of the invention is mass produced from specially die cut 35 millimeter film. This 35 millimeter film, one type of which is made by Eastman Kodak Company, includes four sets of transversely spaced rows of images and four sets of transversely spaced perforations. In accordance with one form of the method of the present invention, this special film is cut longitudinally to form four individual 8 millimeter film strips. These film strips are then cut transversely at longitudinally spaced locations and finally then assembled into film loops of the appropriate size for use in the apparatus of the invention.

SUMMARY OF THE INVENTION

It is an object of the present invention to provide a manually operated toy film viewer of simple design for viewing an 8 millimeter film loop contained within the housing of the viewer.

Another object of the invention is to provide a film viewer of the aforementioned character which is of a simple, straight-forward design that embodies a minimum number of operating components and one which is easy to operate by small children.

Another object of the invention is to provide an 8 millimeter film viewer of the character described in the preceding paragraph which includes a hollow housing within which the loop of 8 millimeter film is controllably moved past a viewing aperature by a manually crank handle which is rotatably connected to one side of the hollow housing. In the preferred form of the invention, the apparatus includes a feed sprocket, a spring biased shutter, a simple optical lens and a translucent screen disposed within a small window which is located opposite the viewing aperature and in close proximity with the film loop. Both the drive sprocket and the shutter of the film viewer are operated by the hand crank which can be easily manipulated by the child to controllably advance the film past the viewing aperture.

Another object of the present invention is to provide a method for protecting the 8 millimeter film strips used in the viewer from a process which involves strategically cutting an elongated length of 35 millimeter film which includes four sets of transversely spaced rows of images and four sets of transversely spaced perforations.

Another object of the invention is to provide a method of the aforementioned character in which the 35 millimeter is specially cut longitudinally to form four individual 8 millimeter film strips which are then cut at transversely located spaced apart locations and finally assembled into film loops of the appropriate size for use in the apparatus of the invention.

Another object of the invention is to provide a method and apparatus of the type described in the preceding paragraphs in which the film viewer and the film strips can be produced in large quantities at very low costs using mass production techniques.

BRIEF DESCRIPTION OF THE DRAWINGS

FIG. 6 is a fragmentary, plan view of the 35 millimeter film strip from which the 8 millimeter film loop of the

3 invention is constructed in accordance with one form of the method of the invention.

FIG. 7 is a generally perspective view of the 8 millimeter film strip of the invention.

DESCRIPTION OF THE INVENTION

Referring to the drawings, and particularly to FIGS. 1–5, one form of the toy film viewer apparatus of the present invention is there illustrated and generally designated by the numeral 12. The film viewer here comprises a housing 14 having a curved front wall 16 and a curved rear wall 18. Formed within front wall 16 is a viewing aperture 20 within which a viewing lens 22 is mounted. Surrounding viewing aperture 20 and lens 22 is an outwardly extending hood-like member 24. Formed in rear wall 18 is a light receiving window 26 within which is mounted a translucent screen 28, the purpose of which will presently be described. Surrounding aperture 26 and translucent screen 28 is an outwardly extending light gathering hood 30. Apertures 20 and 26 are aligned to provide a viewing axis 32 (FIG. 5) along which the child sequentially views the images which are provided on an elongated endless film strip 34 that is movably supported within internal chamber 36 of the housing (FIG. 8).

Figures 3, 4, 5:
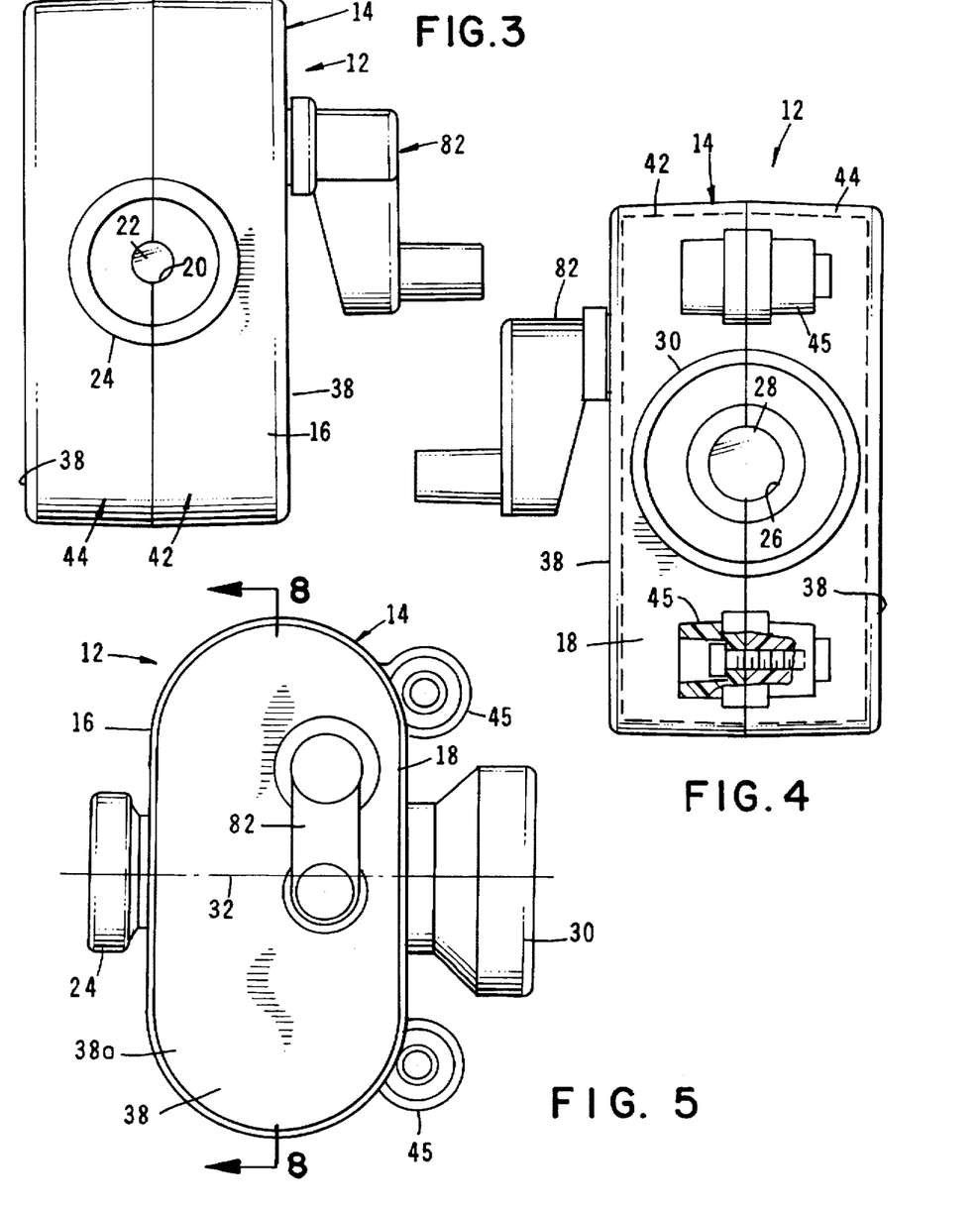
FIG. 3 is a front-elevational view of the film viewer.
FIG. 4 is a rear-elevational view of the viewer partly broken away to show internal construction.
FIG. 5 is a side-elevational view of the apparatus of the invention.
Figure 8:
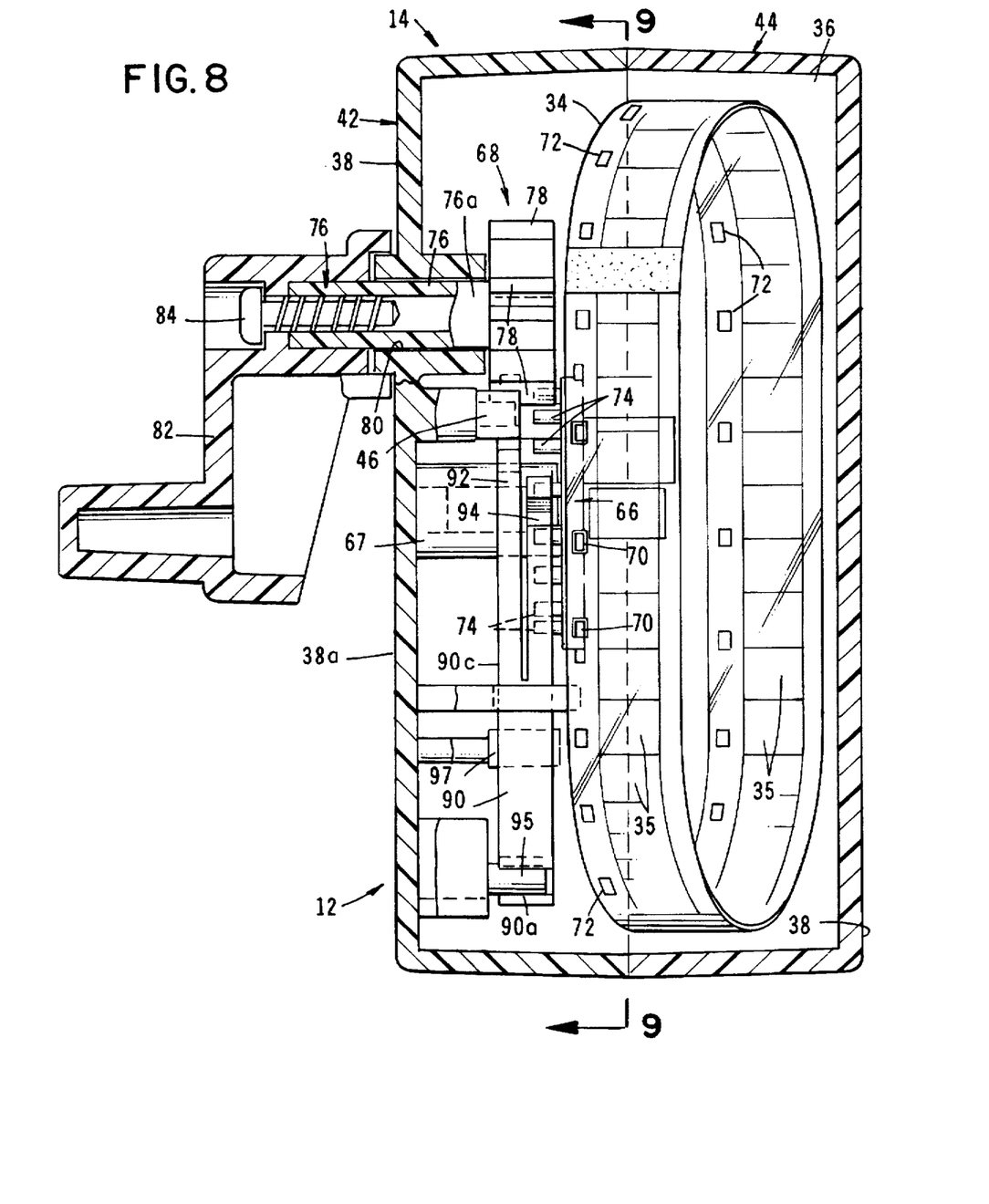
FIG. 8 is a greatly enlarged, cross-sectional view taken along lines 8—8 of FIG. 5.

As best seen by referring to FIGS. 3, 4 and 8, a pair of side walls 38, span front and rear walls 16 and 18 and cooperate therewith to define chamber 36. In the form of the invention shown in the drawings, the curved front and rear walls 16 and 18 are longitudinally bisected to form half walls which are integrally formed with side walls 38 (See FIG. 1). With this construction, when the assemblage 42, which is made up of side wall 38a and bifurcated front and rear walls 16a and 18a, is interconnected with assemblage 44, which is made up of side wall 36b and bifurcated front and rear walls 16b and 18b, the hollow housing 14 shown in FIG. 8 is thus formed. Assemblages 42 and 44 are connected together by connector means 45 of the character shown in FIG. 4. It is to be understood that hollow housing 14 can be constructed in a number of ways from a number of different types of materials including metals, moldable plastics and various composites.

For ease of construction, it is to be noted that all of the moving parts of the toy film viewer are mounted on or interconnected with housing assemblage 42. With this construction, housing assemblage 44 functions merely as

4 closure means to enclose the various internally mounted component parts of the apparatus. In addition to the previously mentioned endless filmstrip 34, which moves within chamber 36 of the housing, a shutter means also moves within chamber 36 of the housing from a first retracted position to a second closed position wherein a portion of the shutter means momentarily covers viewing aperture 20. As best seen by referring to FIGS. 1, 12 and 13, the shutter means of present form of the invention, comprises a shutter member 46 having a body portion 48, a viewing aperture cover element 50 and a downwardly extending leg portion 52. Formed intermediate first and second end portions 48a and 48b of body 48 is a pair of sloping surfaces 54 and 56 the purpose of which will be presently be described. A transverse bore 60 is provided in the second end 48b of the shutter member which closely receives a pivot pin 62. Pivot pin is appropriately connected to, and extends inwardly from side wall 18a of housing assemblage 42 in the manner shown in FIG. 1. Pivot pin 62 forms the pivot access for pivotal movement of the shutter member 46 between the first retracted position shown in FIG. 12 and the second closed position shown in FIG. 13.

Also carried by housing assemblage 42 is the operating means of the invention which functions to operate the shutter means and also functions to controllably advance the film loop relative to the light receiving window 26 so that the images 35 formed on the film loop are sequentially moved past the light receiving window 26. In the present form of the invention, the operating means comprises a feed sprocket 66 which is rotatably mounted within chamber 36 of the housing, and a driving gear assemblage 68 which is also rotatably mounted within chamber 36 of the hollow housing. Feed sprocket 66, which rotates about a hub 67, is generally circular in shape and includes a plurality of circumferentially spaced teeth 70 which are arranged to extend into sprocket holes 72 provided in film strip 34 as the sprocket wheel is rotated. Also provided on sprocket wheel 66 are a plurality of circumferentially spaced, outwardly extending pin like members 74, the purpose of which will presently described.

The drive means of the invention, which comprises a part of the operating means, includes a drive gear 76 having an elongated shaft portion 76a. Formed on shaft portion 76a are a plurality of radially outwardly extending circumferentially spaced teeth 78. In the manner best seen in FIG. 8, shaft 76a extends through an opening 80 provided in wall 38a of housing assemblage 42 and is connected to and is rotatably driven by a crank handle 82. Crank handle 82 is connected to shaft 76 by any suitable means such as a threaded connector 84 of the character shown in FIG. 8. With this construction, rotation of crank handle 82 will impart rotational movement to drive gear 76 (see particularly FIGS. 12 through 15).

Figure 12:
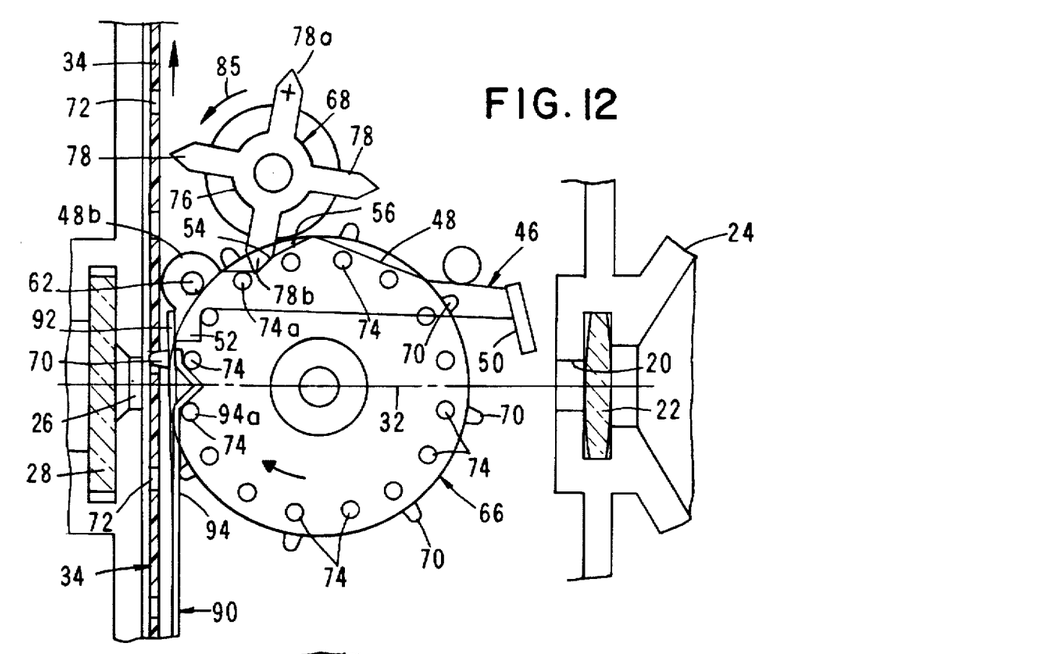
FIG. 12 is a fragmentary, generally diagrammatic view illustrating the manner of advancement of the film strip and the operation of the shutter means of the invention.

Referring next to FIGS. 2, 9, 12 and 13, when the film is positioned within the internal chamber 36 of the housing so that one side of the film loop is in close proximity with light receiving window 26, rotation of crank handle 82 will impart rotation to drive gear 68 in the direction of the arrow 85 of FIG. 12. This rotational movement of the gear assembly will cause teeth 78a and 78b to advance in the manner shown in FIGS. 12 and 13. As tooth 78b advances it will engage sloping surface 54 of shutter member 46 causing downward pivotal movement of the shutter member from the first retracted position shown in FIG. 12 to the second closed position shown in FIG. 13, wherein member 50 moves into a position blocking substantially viewing axis 32. Continued rotation of the gear assembly 68 will cause tooth 78b to ride over sloping surface 54, onto sloping surface 56 and into engagement with pin 76b of the feed sprocket 66. This will impart rotational movement to the feed sprocket in the direction indicated by the arrow 87 in FIG. 13. As the sprocket wheel rotates, tooth 70a of the sprocket wheel will move into aperture 72a provided in film strip 34 causing the film strip to advance upwardly past window 26.

Figures 1, 2:
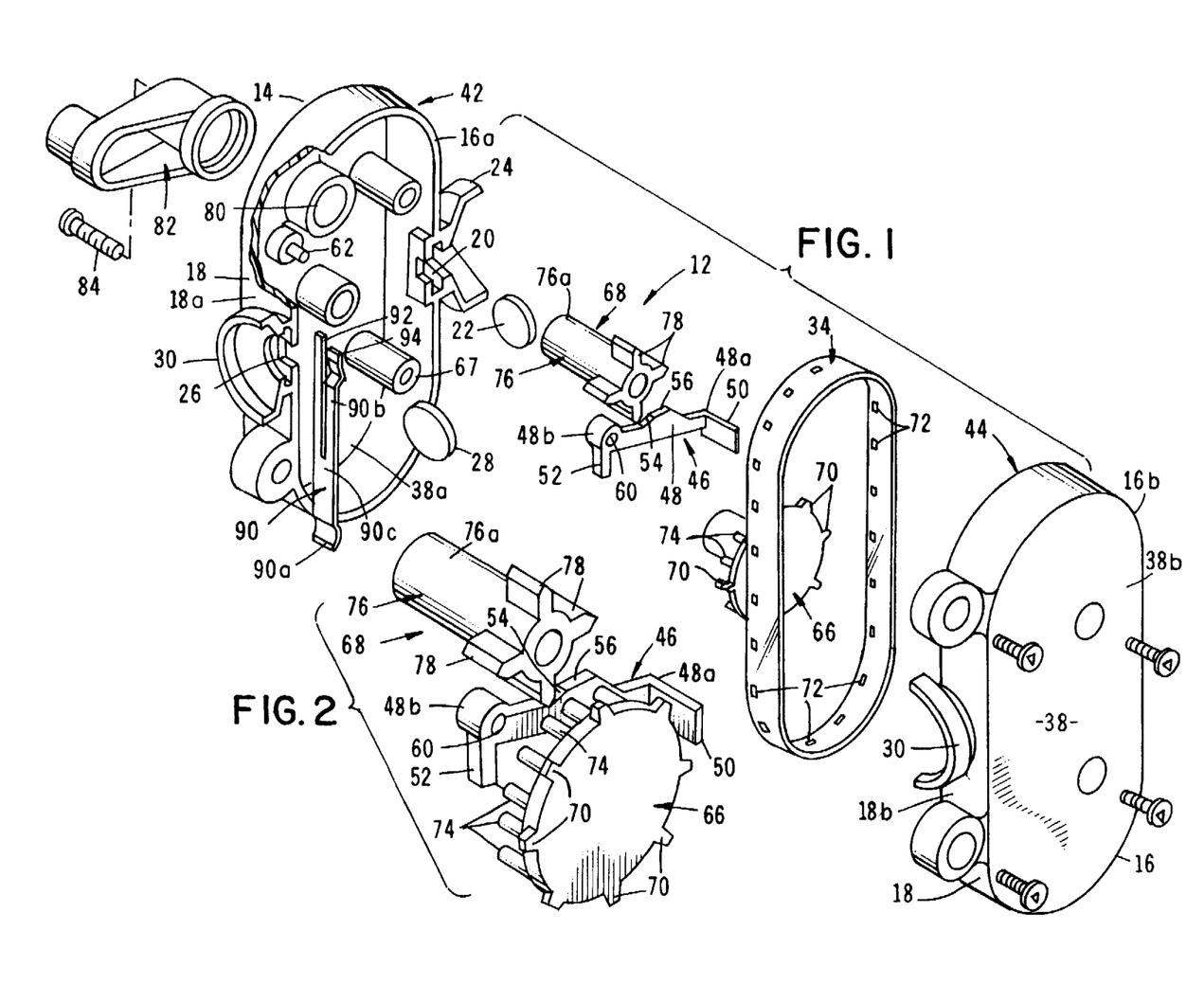
FIG. 1 is a generally perspective, exploded view of one form of the film viewer of the invention.
FIG. 2 is a fragmentary, generally perspective view of a portion of the drive means of the apparatus for advancing the film strip past the viewing aperture of the apparatus.
Figure 9:
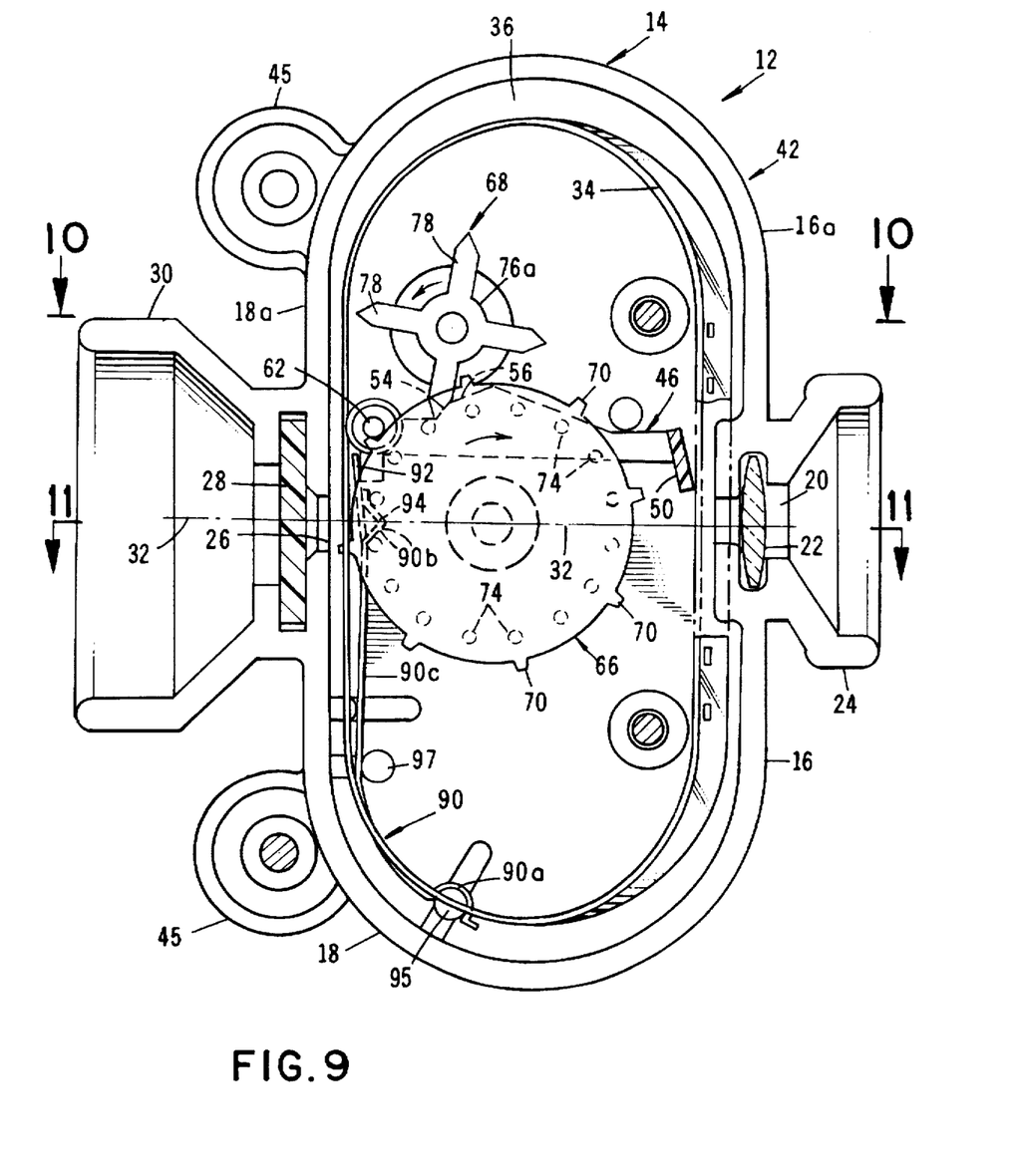
FIG. 9 is a cross-sectional view taken along lines 9—9 of FIG. 8.
Figure 13:
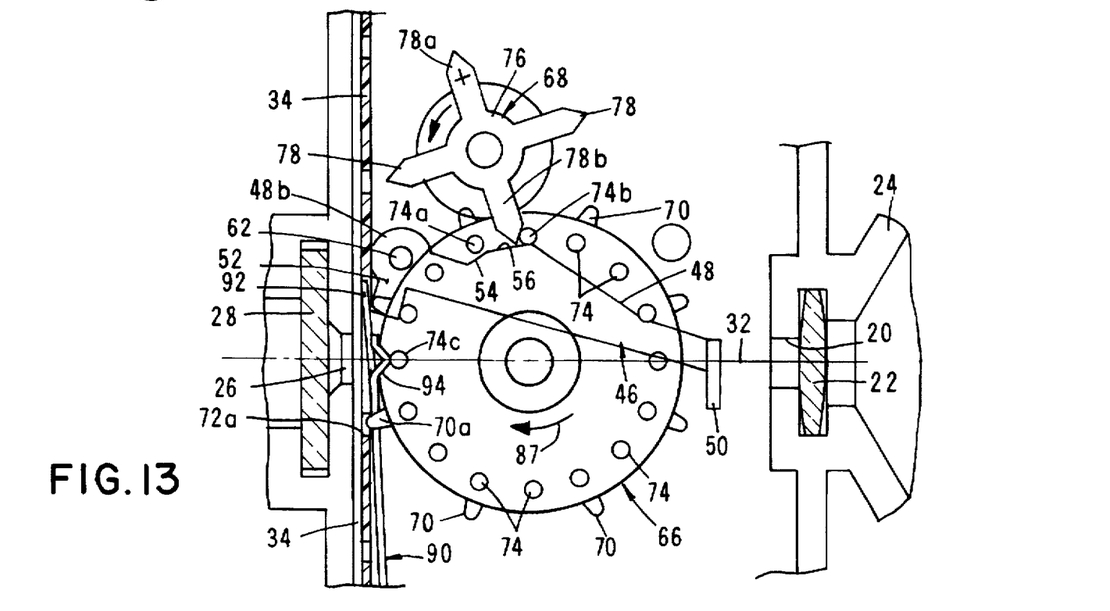
FIG. 13 is a view similar to FIG. 12 but showing advancement of the film strip and lowering of the shutter means of the invention.
Figure 14:
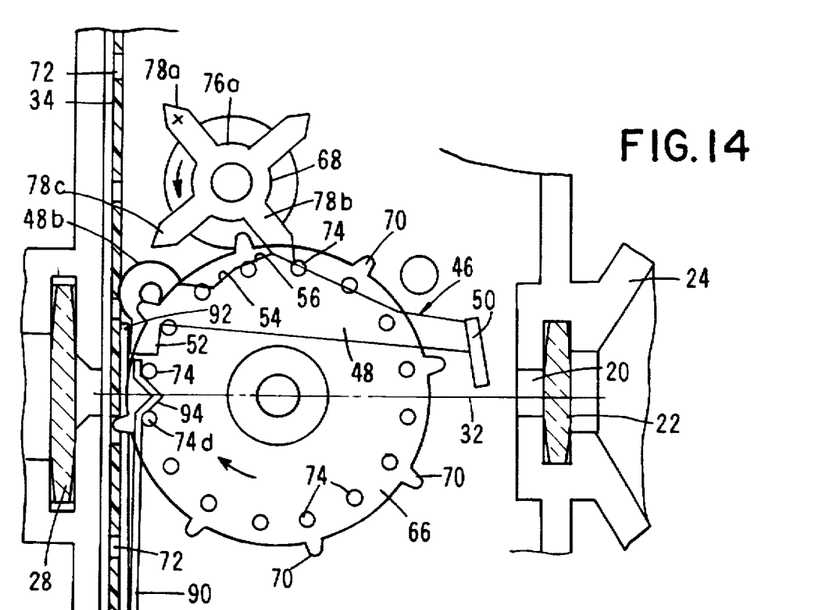
FIG. 14 is a view similar to FIG. 13 illustrating further advancement of the film strip and the movement of the shutter means in the direction toward its starting position.

Referring to FIGS. 1 and 9, an important aspect of the apparatus of the present invention is the provision of biasing means for yieldably resisting movement of the shutter member 46 from the retracted position shown in FIG. 12 to the closed position shown in FIG. 13. In the present form of the invention this biasing means comprises a uniquely configured, elongated spring member 90, having a first end 90a and a second end 90b. End 90b is slit to form a pair of bent fingers 92 and 94. As indicated in FIGS. 9, the biasing means or spring member 90 is mounted within housing 14 so that end 90a engages a positioning pin 95 and central portion 90c engages a positioning pin 97. With this arrangement fingers 92 and 94 are continuously yieldably biased in an inward direction toward shutter member 46 and feed sprocket 66 (see FIGS. 12 and 13). As best seen in FIG. 13, finger 92 of the spring member is maintained in engagement with leg 52 of the shutter member and yieldably resists pivotal movement of the shutter member into the closed position shown in FIG. 13. Accordingly, when the drive gear assembly 68 reaches the position shown in FIG. 14, finger 92 of the biasing means will act upon leg 52 in a manner to return the shutter member toward its starting position shown in FIGS. 12 and 15.

Turning to FIG. 12, it is to be noted that bent finger portion 94 of the biasing means is normally urged into the position shown in FIG. 12 wherein the "V" shaped bend 94a is disposed intermediate a pair of the outwardly extending pins 74 which extend outwardly from sprocket wheel 66. With finger 94 in the position shown in FIG. 12, rotation of the feed sprocket from the position shown in FIG. 12 into the position shown in FIG. 13 is yieldable resisted by the biasing means of the invention. However, as the feed sprocket is moved into the position shown in FIG. 13, finger 94 of the spring member will ride over the adjacent pin(identified as 74c in FIG. 13) thereby permitting rotation of the sprocket in the direction of the arrow 87 of FIG. 13. With this construction, when the sprocket wheel advances to the position shown in FIG. 14, finger 94 will once again be urged into the space between the pins identified in FIG. 14 by the numeral 74c and 74d.

Figure 15:
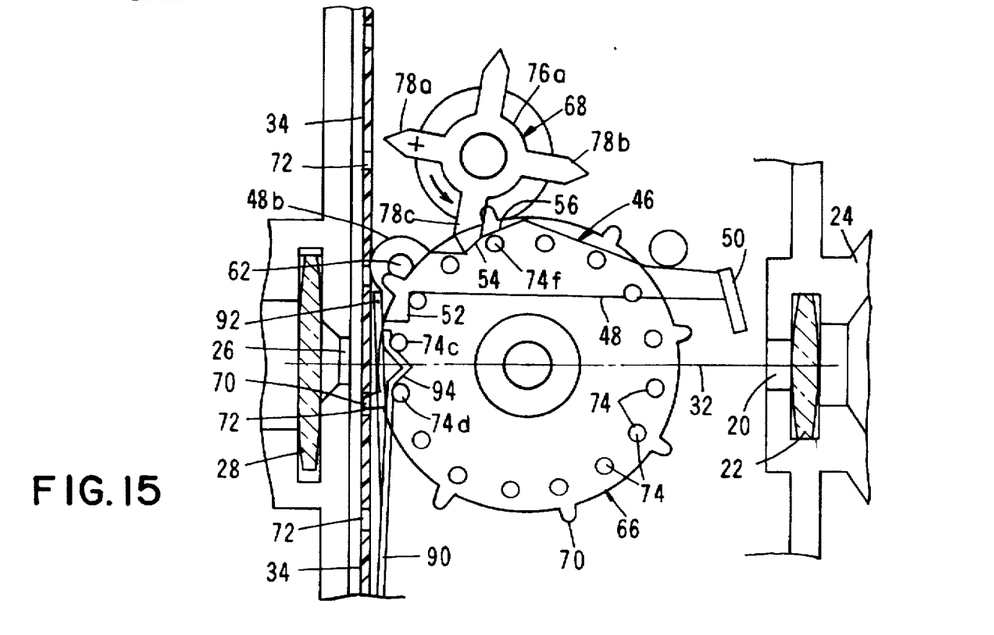
FIG. 15 is a view similar to FIG. 14, but illustrating still further advancement of the film strip and the return of the shutter means to its initial starting configuration.

Continued rotation of gear assembly 68 will cause the moving components of the operating means of the invention to move into the position shown in FIG. 15. In this position, shutter member 46 has completely returned to its starting position due to the urging of finger 92 and gear tooth 78c has moved into engagement with slopping surface 54. As the gear assembly 68 continues to rotate as a result of rotational crank handle 82, tooth 76c will act on slopping surface 54 of the shutter means to move the shutter means toward the second closed position. This movement of the shutter means will enable tooth 78c to engage the next adjacent pin shown in FIG. 15 as 74f causing rotation of the feed sprocket against the urging of the finger 94 of the biasing means.

Figures 6, 7:
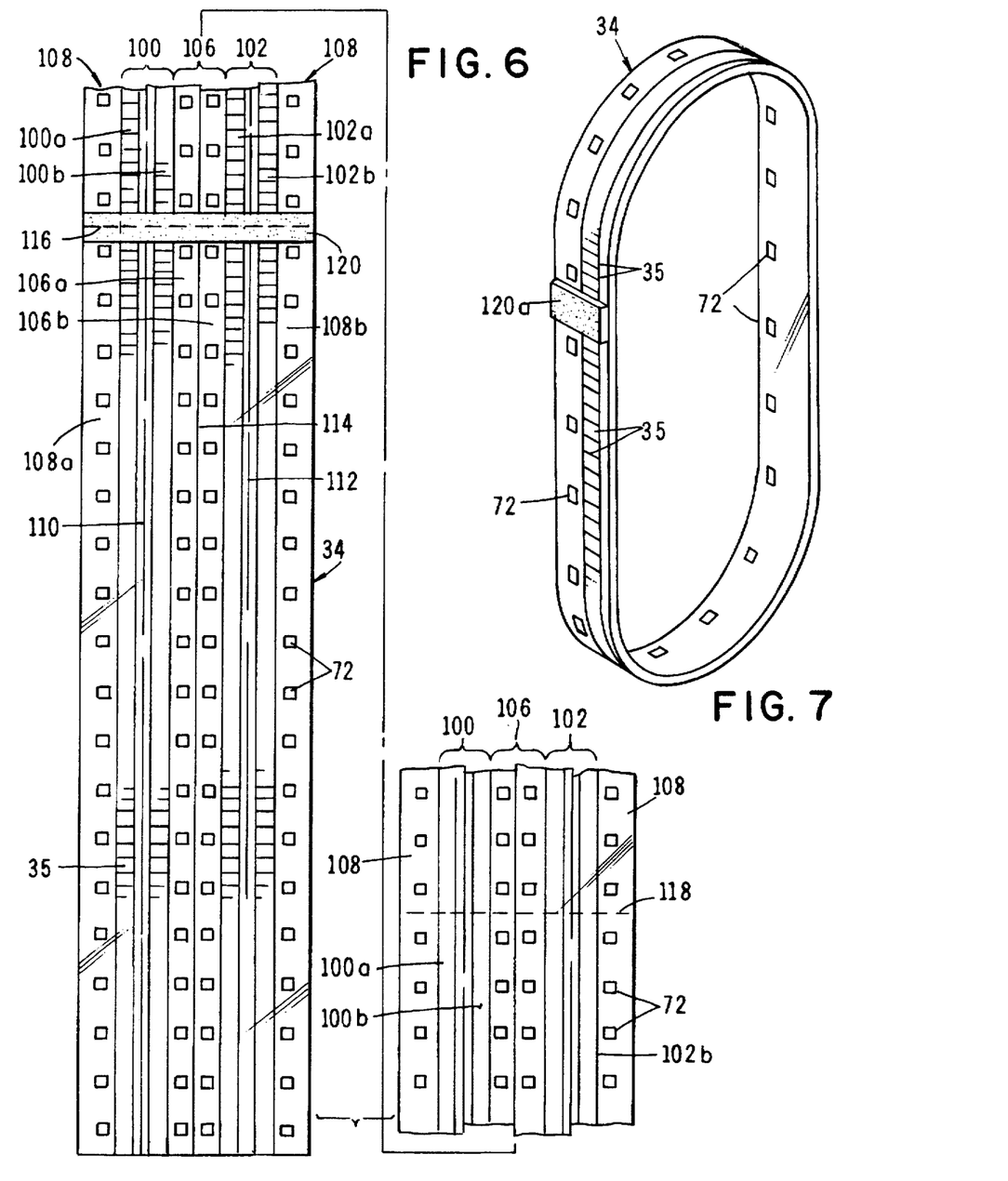
Figure 10:
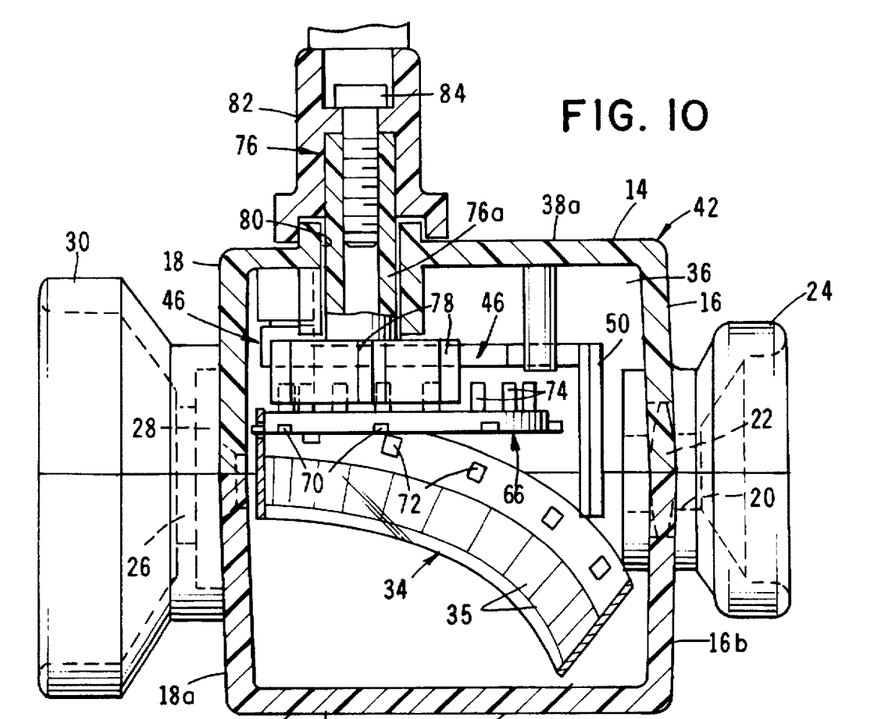
FIG. 10 is a cross-sectional view taken along lines 10—10 of FIG. 9.
Figure 11:
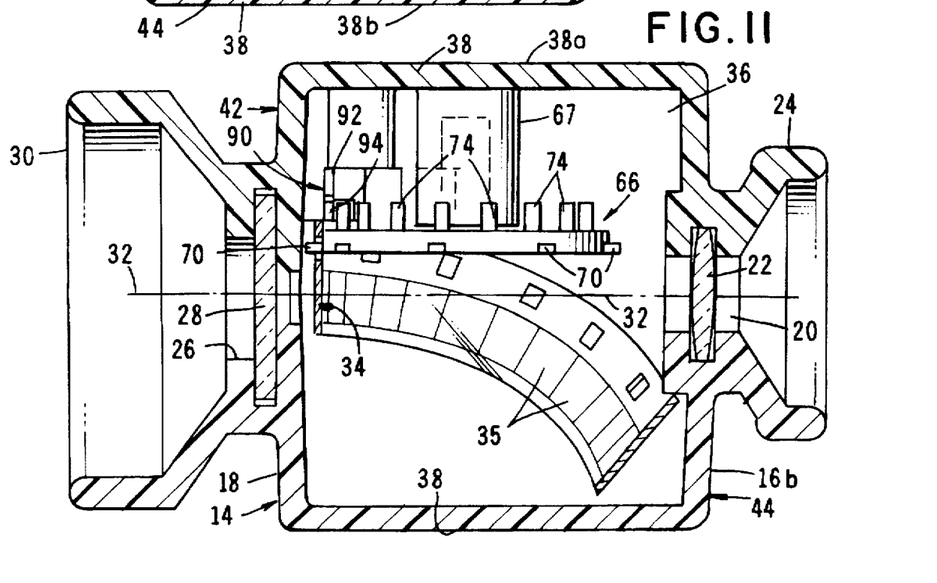
FIG. 11 is a cross-sectional view taken along lines 11—11 of FIG. 9.

An extremely important aspect of the present invention is the method for making the 8 millimeter film strip which is angularly disposed within chamber 36 of the hollow housing (see FIGS. 8, 10, and 11). This novel method of the invention, which is illustrated in FIG. 6 and 7 of the drawings, comprises the steps of strategically cutting a length of 35 millimeter film of the general character shown in FIG. 6. This film is a special type of 33 millimeter film which is commercially available from Eastman Kodak under the designation 35-324ROW. As best seen in FIG. 6, the 35 millimeter strip of film has first and second pairs 100 and 102 of longitudinally extending, transversely spaced apart rows of images 35. The rows of images of first pair 100 are designated in FIG. 6 by the numerals 100a and 100b, while the rows of images comprising second pair of images 102 are designated as 102a and 102b. Also formed in the specially configured 35 millimeter film strip is a first pair 106 of centrally disposed, longitudinally extending, transversely spaced apart rows 106a and 106b of sprocket holes and a second pair 108 of longitudinally extending, transversely spaced apart, marginally disposed rows 108a and 108b of sprocket holes. The highly novel method of the present invention for forming the endless film strip 34 of the character shown in FIG. 7 involves the steps of first cutting the length of 35 millimeter film along its length at a location 110 which is disposed intermediate rows 100a and 100b of the first pair of longitudinally extending transversely spaced apart rows of images. The next step in the method of the invention comprises the step of cutting length of 35 mm film along its length at a location 112 which is disposed intermediate rows 102a and 102b of the second pair 102 of longitudinally extending transversely spaced apart rows of images.

After the film strip has been cut at locations 110 and 112, the length of 35 millimeter film is cut along its length at a location 114 which is disposed intermediate rows 106a and 106b of the pair of sprocket holes 106.

Following the longitudinal cutting the film strip 35 into four segments, the length of 35 millimeter film is then cut transversely at a plurality of locations, such as those shown in FIG. 6, by the dotted lines and identified by the numerals 116 and 118 respectively. It is to be understood that the distance between transverse cuts 116 and 118 is substantially equal to the overall length of the film strip 34. This overall or first length of the film strips is such that the film strip will conveniently fit into chamber 36 of the housing in the angular disposition shown in FIGS. 8, 10, and 11 of the drawings.

Following the formation of the transverse cuts of the length of 35 millimeter film, in one form of the method of the invention, the film is held together by notches left after the cutting operation which functions to temporarily prevent separation of the 8 mm lengths of film formed by the longitudinal and transverse cuts.

With the two sided tape 120 in position over the transverse cuts, the cut and bonded film thus formed which comprises a plurality of four 8 millimeter lengths of film can be suitable rolled onto film reel for transport from the film processing location where the cutting steps are accomplished to a device assembly location where the various components of the device including the film loop 34, are assembled to form the completed toy film viewer of the invention shown in FIGS. 3, 4 and 5.

It is to be understood that the first and second ends of each of the 8 millimeter film strips produced in accordance with the previously described method of the invention can be bonded together using any type of adhesive material that will form a secure adhesive bond between the end portions of the film strips.

It is also to be understood that, if desired, the film loops 34 can be produced at the film processing location by separating the multiplicity of lengths of 8 millimeter film formed by the cutting process and then bonding together the ends of each individual length to form a film loop of the character shown in FIG. 7 and identified by the numeral 34. In the film loop shown in FIG. 7, the first and second ends portions 34a and 34b of the film strip are shown bonded together by a length of double sided tape 120a which comprises a length of tape approximately ¼ the length of strip 120 of adhesive tape which spans the width of 35 millimeter film in the manner shown in FIG. 6.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A toy film viewer comprising:
   (a) a housing having an internal chamber, a viewing aperture and a light-receiving window disposed in alignment with said viewing aperture to provide a viewing axis between said viewing aperture and said light-receiving window;
   (b) shutter means for covering said viewing aperture, including, a shutter pivotally mounted within said internal chamber of said housing for movement between first retracted position and a second closed position covering said viewing aperture;
   (c) an endless film loop carried within said internal chamber of said housing, said film loop being disposed at an angle relative to said viewing axis and having a multiplicity of circumferentially spaced images formed thereon;
   (d) operating means for operating said shutter means and for controllably advancing said film loop relative to said light-receiving window in a manner to sequentially move said images past said light-receiving window.

2. A toy film viewer as defined in claim 1 further including lens means mounted within said viewing aperture for converging light rays upon a location proximate said light receiving window.

3. A toy film viewer as defined in claim 1 further including a translucent screen mounted within said light receiving window.

4. An apparatus as defined in claim 1 in which said operating means comprises:
   (a) a feed sprocket rotatably mounted within said chamber in said housing, said feed sprocket being engageable with said film loop for controllably moving said film loop relative to said light-receiving window;
   (b) drive means for driving said feed sprocket and for operating said shutter, said drive means comprising a driving gear rotatably connected to said housing, said drive gear having circumferentially spaced teeth constructed and arranged to engage said feed sprocket and said shutter; and
   (c) a handle rotatably connected to said housing for controllably rotating said driving gear.

5. A toy film viewer as defined in claim 4 in which said film loop includes a multiplicity of spaced apart openings and in which said feed sprocket includes a plurality of circumferentially spaced teeth receivable within said openings in said film loop.

6. A toy film viewer as defined in claim 5 in which said shutter includes:
   (a) a body portion having first and second ends and a sloping surface disposed intermediate said first and second ends, said sloping surface being engageable by said teeth of said driving gear to impart pivotal movement to said shutter;
   (b) a viewing aperture cover element connected to said first end of said body portion; and
   (c) a leg portion connected to said second end of said body portion and extending outwardly therefrom.

7. A toy film viewer as defined in claim 6 in which said housing is provided with a pivot pin extending into said internal chamber, and in which said shutter is pivotally connected to said pivot pin.

8. A toy film viewer as defined in claim 7 further including biasing means mounted within said internal chamber of said housing for yieldably resisting movement of said shutter from said first retracted position to said second closed position.

9. A toy viewer as defined in claim 8 in which said biasing means comprises an elongated spring having a first end connected to said housing and a second free end biased toward said leg portion of said body portion of said shutter for yieldably resisting pivotal movement of said shutter.

10. A toy viewer as defined in claim 9 in which said second free end of said elongated spring is biased toward said feed sprocket for yieldably resisting rotation of said feed sprocket within said housing.

11. A toy film viewer comprising:
    (a) a housing having a front wall, a rear wall and a pair of side walls connected to and spanning said front and rear walls to define an internal chamber, said front wall having a viewing aperture formed therein and said rear wall having a light-receiving window disposed in alignment with said viewing aperture to provide a viewing axis between said viewing aperture and said light-receiving window;
    (b) a translucent screen mounted within said light receiving window;
    (c) lens means mounted within said viewing aperture, said lens means having a focal point located proximate said translucent screen;
    (d) shutter means for covering said viewing aperture, including a shutter pivotally mounted within said chamber of said housing for movement between first retracted position and a second closed position covering said viewing aperture;
    (e) biasing means for yieldably resisting movement of said shutter from said first retracted position to said second closed position;
    (f) an endless film loop carried within said chamber of said housing, said film loop being disposed at an angle relative to said viewing axis and having a multiplicity of circumferentially spaced images from thereon;
    (g) operating means for operating said shutter means and for controllably advancing said film loop relative to said translucent screen in a manner to sequentially move said images past said translucent screen, said operating means comprising:
       (i) a feed sprocket rotatably mounted within said chamber of said housing, said feed sprocket having a plurality of outwardly extending pins and having a plurality of circumferentially spaced teeth engageable with said film loop for controllably moving said film loop relative to said light-receiving window;
       (ii) drive means for driving said feed sprocket and for operating said shutter, said drive means comprising a driving gear rotatably connected to said housing, said drive gear having circumferentially spaced teeth constructed and arranged to engage said outwardly extending pins of said feed sprocket and said shutter; and (iii) a handle rotatably connected to said housing for controllably rotating said driving gear.

12. A toy film viewer as defined in claim 11 in which said film loop comprises a length of 8 millimeter film having first and second ends adhesively bonded together to form an endless loop.

13. A toy film viewer as defined in claim 11 in which said shutter includes:

(a) a body portion having first and second ends and a sloping surface disposed intermediate said first and second ends, said sloping surface being engageable by said teeth of said driving gear to impart pivotal movement to said shutter;

(b) a viewing aperture cover element connected to said first end of said body portion; and (c) a leg portion connected to said second end of said body portion and extending outwardly therefrom.

14. A toy film viewer as defined in claim 13 in which one of said side walls of said housing is provided with an inwardly extending pivot pin and in which said shutter is pivotally connected to said pivot pin proximate said second end thereof.

15. A toy film viewer as defined in claim 14 further including biasing means mounted within said housing for yieldably resisting movement of said shutter from said first-retracted position to said second closed position.

16. A toy viewer as defined in claim 15 in which said biasing means comprises an elongated spring having a first end connected to said housing and a second bifurcated, free end defining first and second fingers one of said fingers being biased toward said leg portion of said body portion of said shutter for yieldably resisting pivotal movement of said shutter and the other of said fingers being biased toward said sprocket for yieldably resisting rotation of said feed sprocket within said housing.

17. A method of making 8 millimeter film loops of a first length from a length of 35 millimeter film having first and second pairs of longitudinally extending, transversely spaced apart rows of images, a first pair of centrally disposed, longitudinally extending, transversely spaced-apart rows of sprocket holes and a second pair of longitudinally extending, transversely spaced-apart, marginally disposed rows of sprocket holes, said method comprising the steps of:

(a) cutting the length of 35 millimeter film along its length at a location intermediate the rows of images which comprise the first pair of longitudinally extending, transversely spaced-apart rows of images;

(b) cutting the length of 35 millimeter film along its length at a location intermediate the rows of images which comprise the second pair of longitudinally extending, transversely spaced-apart rows of images;

(c) cutting the length of 35 millimeter film along its length at a location intermediate the rows which comprise the first pair of centrally disposed, longitudinally extending transversely spaced-apart rows of sprocket holes; and (d) cutting the length of 35 millimeter film transversely at a plurality of longitudinally spaced locations, said locations being spaced apart by a distance equal to the first length of the 8 millimeter film loops to form a multiplicity of lengths of 8 millimeter film strips of a first length, each film strip having first and second end portions.

18. A method as defined in claim 17 including the further step of connecting together said first and second end portions of each said film strip to form a multiplicity of 8 millimeter film loops.

19. A method as defined in claim 18 in which said first and second end portions of said film strips are connected together by means of an adhesive bond.

20. A method as defined in claim 19 in which said first and second end portions of said film strips are connected together using adhesive tape.

* * * * *